G. C. Perry,
Hay Fork.
No. 91,160.  Patented June 8, 1869.
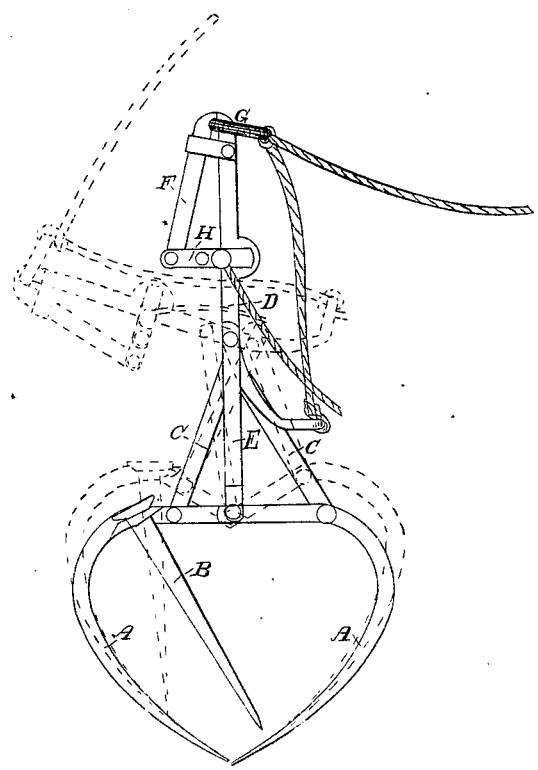

United States Patent Office.

GEORGE C. PERRY, OF ORTONVILLE, MICHIGAN.

Letters Patent No. 91,160, dated June 8, 1869.

---

IMPROVEMENT IN HORSE HAY-FORKS.

---

The Schedule referred to in these Letters Patent and making part of the same.

---

*To all whom it may concern:*

Be it known that I, GEORGE C. PERRY, of Ortonville, in the county of Oakland, and in the State of Michigan, have invented certain new and useful Improvements in Horse Hay-Forks; and do hereby declare that the following is a full, clear, and exact description thereof, reference being had to the accompanying drawings, and to the letters of reference marked thereon.

The nature of my invention consists in the arrangement of certain devices so as to form a horse hay-fork, as will hereafter be set forth and explained.

The accompanying drawing represents a side view of my invention.

Letter A represents the curved tines of my fork, which are pivoted at the top, in the usual manner.

To one side of one of these tines, at the top, there is a loop placed, through which the long straight tine B is placed, which assists in holding the hay, after it has been grappled by the curved ones.

Attached to each one of the curved tines, there is a lever, C, both of which are pivoted, at their tops, to the main brace D, by means of which the tines A are opened and closed.

Extending upward, and pivoted to the two curved tines in the centre, is a short brace, E, which is pivoted at its top to the main one D.

The lower end of this main brace is curved outward, and formed into a loop, so that the elevating-cord can be attached to it.

At the top of this brace there is attached a movable jaw, F, which is used to catch the ring G on the rope.

The rods or plates, near the top, are pivoted to the brace, but the one at the bottom has a joint in it, so that the upper end can be made to come in contact with the upper end of the brace, where it is securely held.

Upon the jointed rod H is placed a button, to which the trip-cord is attached.

The manner of using my fork is as follows:

The elevating-cord is attached to the end of the brace D, which then assumes the position as shown by the red lines, causing the tines A to open. In this position it is dropped upon the hay, which, after being pressed down so as to get a firm hold, are then closed by raising the bar D to an upright position. The straight tine B is then forced in, and the ring G secured by the jaw F. The load is now ready to be raised.

In order to dump it, pull upon the trip-cord, which opens the jaw F so as to release the ring, when the load is at once released by the opening of the tines.

Having thus described my invention,

What I claim, and desire to secure by Letters Patent, is—

1. The straight tine B, when used in the manner and for the purpose specified.

2. The tines A and B, levers C, braces D and E, and jaw F, when all are combined and operated substantially in the manner and for the purpose set forth.

In testimony that I claim the foregoing, I have hereunto set my hand, this 6th day of April, 1869.

GEORGE C. PERRY.

Witnesses:
MOSES G. SPEAR,
ROBERT S. PRICE.